United States Patent [19]

Naddeo

[11] Patent Number: 5,234,544
[45] Date of Patent: Aug. 10, 1993

[54] CLEANING AND BLEACHING OF SECONDARY FIBER

[75] Inventor: Ronald C. Naddeo, Kempton, Pa.

[73] Assignee: Air Products and Chemicals, Inc., Allentown, Pa.

[21] Appl. No.: 792,512

[22] Filed: Nov. 13, 1991

Related U.S. Application Data

[63] Continuation-in-part of Ser. No. 423,298, Oct. 18, 1989, abandoned.

[51] Int. Cl.$^5$ .......................... D21C 5/02; D21C 9/12; D21C 9/147
[52] U.S. Cl. .......................................... 162/5; 162/6; 162/8; 162/65; 162/66; 162/89
[58] Field of Search .................... 162/5, 6, 8, 14, 63, 162/65, 66, 88, 89

[56] References Cited

U.S. PATENT DOCUMENTS

| | | | |
|---|---|---|---|
| 4,360,439 | 11/1982 | Calmanti et al. | 252/61 |
| 4,381,969 | 5/1983 | DeCeuster et al. | 162/5 |
| 4,390,395 | 6/1983 | DeCeuster et al. | 162/5 |
| 4,416,727 | 11/1983 | Elton et al. | 162/6 |
| 4,935,096 | 6/1990 | Gallagher et al. | 162/5 |

FOREIGN PATENT DOCUMENTS

| | | |
|---|---|---|
| 247932 | 7/1987 | Fed. Rep. of Germany . |
| 247934 | 7/1989 | Fed. Rep. of Germany . |
| 348664 | 9/1972 | U.S.S.R. . |

OTHER PUBLICATIONS

Markham, L. D., et al; *TAPPI 1988 Pulping Conf. Proceedings*; pp. 189–196.

Primary Examiner—W. Gary Jones
Assistant Examiner—Todd J. Burns
Attorney, Agent, or Firm—John M. Fernbacher; James C. Simmons; William F. Marsh

[57] ABSTRACT

Secondary pulp is deinked and bleached by contacting the pulp simultaneously with oxygen, alkali, and a surfactant in a reaction zone followed by washing to recover a secondary fiber product. Simultaneous contacting with oxygen and surfactant yields higher pulp brightness than sequential contacting in oxygen bleaching and washing stages, and enhances bleachability in further bleaching stages.

14 Claims, 5 Drawing Sheets

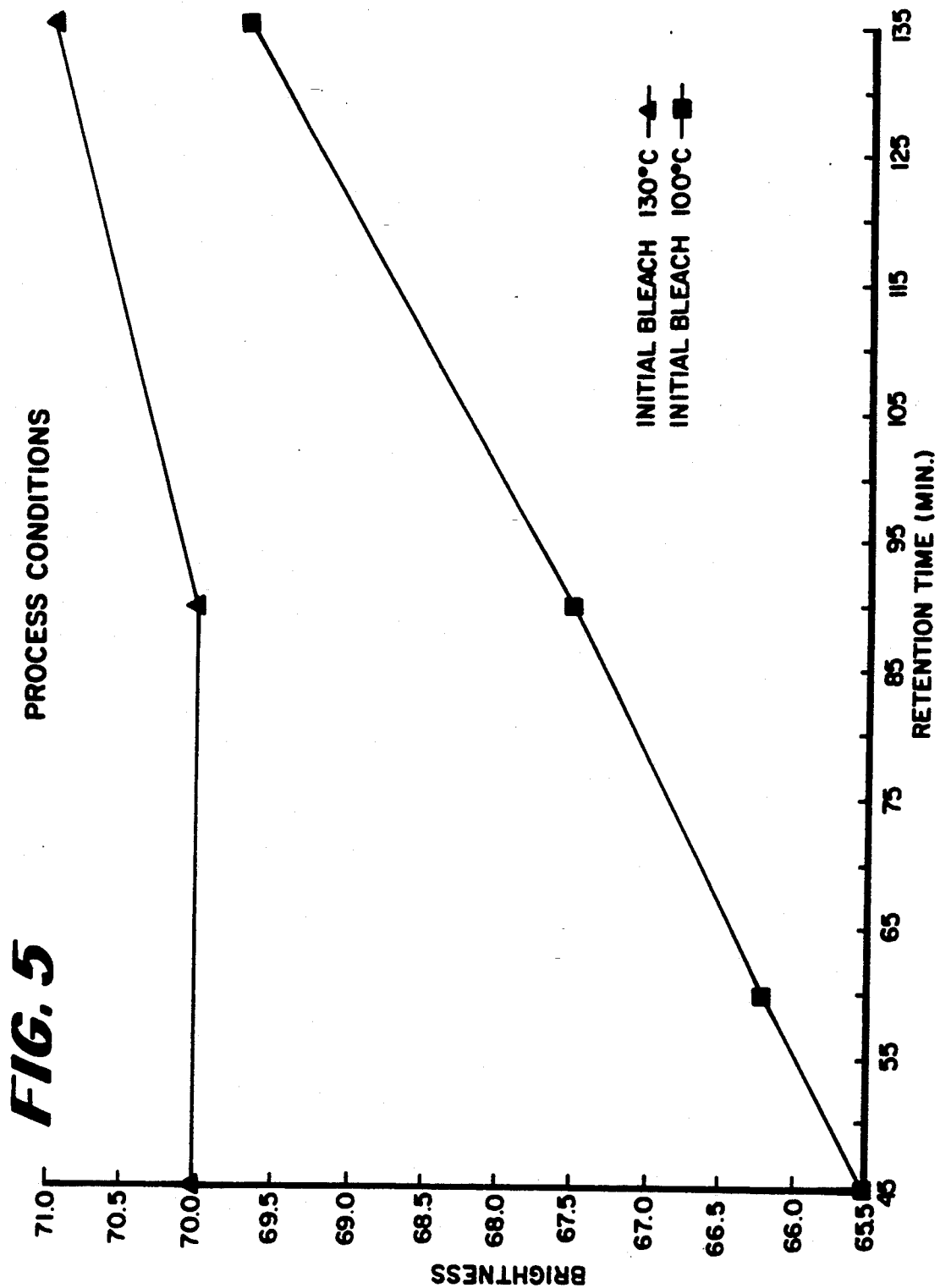

CLEANING AND BLEACHING OF SECONDARY FIBER

This application is a continuation-in-part of application Ser. No. 07/423,298 filed on Oct. 18, 1989 now abandoned.

TECHNICAL FIELD

The present invention relates to the cleaning and bleaching of secondary cellulosic fibers and is particularly concerned with improvements in the methods for treatment of such fibers by utilizing oxygen and surfactants in the cleaning and bleaching steps.

BACKGROUND OF THE INVENTION

In existing conventional plants for cleaning and bleaching of secondary fibers, such as salvaged old papers and other reused or recycled fiber-containing materials, these materials are collected and segregated in piles according to type (ledger, newspaper, cardboard, etc.). The fiber materials from these piles are blended in a hydropulper, pulped and cleaned, followed when required by a cleaning step carried out by water washing or by flotation. The cleaned and deinked pulp, typically containing from 5 to 10% of the original ink present in the waste paper, is then directed to the bleach plant where it is subjected to one or more bleaching stages, each stage involving distinctly different treating chemicals and process conditions. The initial pulping and washing eliminates most of the contaminants (including ink) present in the fiber, and the subsequent bleaching stages brighten the pulp. The effectiveness of the pulp bleaching is measured and designated by parameters of brightness, contaminant count, and viscosity (a measure of pulp strength).

For the cleaning and bleaching of recycled waste paper and other secondary fiber materials, the most common practices employ chlorine-based chemicals (generally for fine papers) or hydrosulfide (generally for newspaper stock). Various treating sequences are utilized in the bleaching of the recycled pulp to attain desired brightness levels, typically above 76 brightness (GE) and commonly in the range of 78–Over 80% of the fine paper (ledger) bleaching utilizes a CEH, CH, or H sequence. As commonly employed in the art these letter designations respectively stand for:

C = Chlorination with chlorine ($Cl_2$)
E = Alkali extraction with NaOH
H = Alkaline hypochlorite (NaOCl)

Concern over the negative impact on the environment of chlorine-based bleach plant effluents has accelerated in recent years, particularly since the discovery of the highly toxic chlorinated dioxins and furans in some bleach plant effluents, sludge, and pulp products. Today it is generally accepted that it is critical to reduce the amount of chloro-organics in pulp products and in the plant effluents.

Since formation of chlorinated organics is strongly related to the use and consumption level of molecular chlorine in the chlorination and hypochlorite stages of the conventional bleaching sequence, it is of greater importance to minimize formation of chloro-organics through a cost-effective means to reduce the amount of chlorine utilized in the chlorination and hypochlorite stages, rather than rely on post-treatment technologies such as advanced wastewater treatment systems. Unlike the kraft paper industry (virgin wood processing), the recycled paper industry is only beginning to deal with the issue of chlorinated toxins including the initiation of projects involving the reduction of chlorine and hypochlorite.

Most of the more common treating sequences employed or proposed for bleaching and delignifying of kraft pulp as well as those concerned with bleaching of secondary fibers are chlorine based. While some experimental research has been directed to the use of molecular oxygen in processes for bleaching of secondary fiber (Markham, L. D., et al., *TAPPI* 1988 *Pulping Conference Proceedings*, pp 189–196), these attempts generally have failed to produce a pulp with acceptable brightness without also using comparatively large amounts of chlorinated chemicals in the bleaching sequence.

U.S. Pat. No. 4,360,439 discloses a deinking agent composition comprising a salt of a fatty acid, a nonionic surfactant, an anionic surfactant, a sodium carboxycellulose, and an alkaline inorganic salt of the group comprising metasilicate, disilicate, carbonate, borate, and polyphosphate. An improved washing process for deinking printed waste paper is also disclosed.

A process for the bleaching of waste paper containing encapsulated constituents such as inks is disclosed in U.S. Pat. No. 4,381,969 wherein the paper is pulped in the presence of an alkaline solution containing peroxide.

U.S. Pat. No. 4,390,395 describes a process for disintegrating waste paper to form pulp which comprises disintegrating waste paper in the presence of an aqueous phase and a peroxide bleaching agent at a high consistency in the range of 22 to 45%. Surfactants are optionally added during the disintegration step.

A method for the oxygen-alkali treatment of waste paper broke containing wet strength resins is disclosed in U.S. Pat. No. 4,416,727. The oxygen-alkali treatment liberates fiber from the resin, and the fiber can be recycled to the papermaking process to make recycled paper products.

Related German Democratic Republic Patents DD 247,932 A1 and DD 247,934 A1 disclose a method for improving the strength and optical homogeneity of deinked waste paper pulp by treating the pulp with oxygen and alkali following conventional dispersion and cleaning steps.

An improved method for the deinking of cellulosic materials is disclosed in U.S. Pat. No. 4,935,096 wherein the material is dispersed, pulped, and washed to remove liberated ink. An ionic surfactant is added to any of the dispersion, pulping, and washing steps.

The present invention as disclosed and claimed below offers an improved method for the cleaning and bleaching of secondary pulps which reduces the amount of subsequent bleaching required to produce recycled paper products having satisfactory brightness.

SUMMARY OF THE INVENTION

In accordance with the present invention, pulped secondary fiber is treated with an oxygen-containing gas in the presence of added alkali and a surfactant, followed by washing in an aqueous medium optionally containing another surfactant, which may be followed if desired by further treatment in one or more final bleach stages. It has been found in the present invention that the simultaneous contacting of pulp, surfactant, and oxygen in a reaction zone yields an unexpectedly brighter and cleaner pulp compared with the separate addition of the same dose of surfactant in a wash step following oxygen-alkali treatment. Further, the use of a surfactant in an oxygen alkali bleaching stage following chlorination was found to enhance the bleachability of the pulp in a subsequent chemical bleaching stage.

BRIEF DESCRIPTION OF THE DRAWINGS

The invention will be more clearly understood and its several advantages appreciated from the description which follows read in connection with the accompanying drawings, wherein:

FIG. 5 comprises graphs showing the effect on attained brightness by variations in retention time in the treating sequence at two different temperatures.

DETAILED DESCRIPTION OF THE INVENTION

The present invention is a method for the bleaching and cleaning of secondary pulp prepared from waste paper material by contacting the pulp with oxygen, alkali and surfactant in a heated and pressurized reaction zone. The term bleaching as used in this specification means any chemical treatment of the pulp which changes the chromophoric nature of contaminants in the pulp such that brightness is increased. The term cleaning means the removal of contaminants from the pulp fibers and separation of these contaminants from the cleaned fibers. Contaminants are undesirable materials in the pulp which decrease brightness and optical homogeneity, such as ink, dirt, lignin, dyes, coatings, fillers, and the like. Contaminants optionally may include stickies which are particles of adhesive material derived from waste paper containing glues, adhesives, resins, and the like. Some waste papers contain stickies while others contain none.

Figure 1:
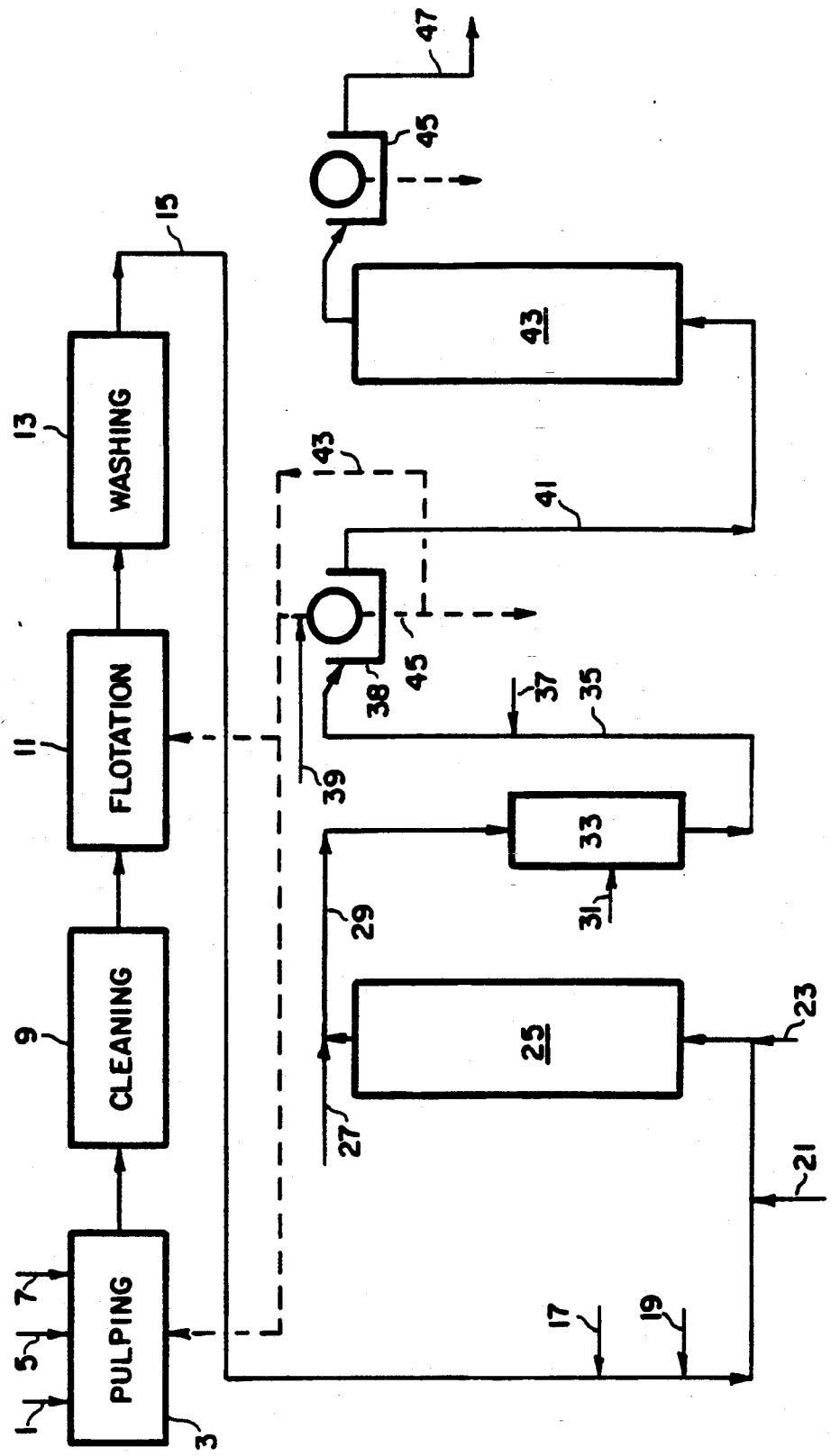
FIG. 1 is a process flowsheet depicting a system for the oxygen-surfactant stage and water wash applied to the secondary fiber pulp in practice of an embodiment of the invention.

Referring to FIG. 1, waste paper 1 is disintegrated and pulped in pulping step 3 with water 5 and cleaning chemicals 7, and the pulp is subjected to cleaning (9), flotation (11), and washing (13) steps as is known in the art. Other steps such as dispersion and screening also may be employed. Cleaned pulp 15, which typically contains 5 to 10% of the original contaminants and ink present in waste paper 1 and is essentially free of cleaning and deinking chemicals, is further cleaned and bleached by the method of the present invention. Alternately, the method of the present invention can be utilized for further cleaning and bleaching of pulp directly from pulping stage 3 or cleaning stage 9. Pulp 15 is heated typically by injection of steam 17, is dosed with an alkali 19 such as sodium hydroxide, a surfactant 21 and oxygen 23 are added, and the pulp passes through reaction zone 25 to oxidize residual ink and bleach the pulp fibers. Reaction zone 25 is typically a pipeline, tube, or tower reactor as is known in the art, and includes piping downstream of a tube or tower reactor when cleaning and bleaching reactions occur in this piping. The reactor is operated at a pressure between about 10 and 120 psig, a temperature between about 120° and 300° F., a consistency between about 4 and 40%, and a residence time between about 1 and 120 minutes. Surfactant alternately can be added at the discharge of reaction zone 25 as stream 27, and as long as residual unreacted oxygen is present in the pulp, the reaction of oxygen with pulp impurities will continue in line 29 in the presence of the surfactant. The critical feature of the invention is that oxygen and surfactant must be present simultaneously at least part of the time during the reaction with pulp impurities. The surfactant is selected from anionic, cationic, nonionic, or polymeric surfactants or mixtures of these types of surfactants. Nonyl ethoxylated, dodecyl ethoxylated, and alkyl phenyl ethoxylated linear alcohols are especially useful surfactants which can be used in the present invention.

Treated pulp 29 is diluted with water 31 in dilution zone 33 to a consistency of between 1 and 4%, surfactant is optionally added as stream 37 to pulp 35 or directly to washer 38 as stream 39, and the pulp is washed in washer 38. Surfactants 37 and 39 can be selected from those listed above. This washing step removes contaminants and reaction products of reaction zone 25 to yield further cleaned and bleached pulp 41, and a portion 43 of wash water 45 is optionally recycled to one or more of the primary pulping and cleaning steps 1, 9, 11, and 13. Pulp 41 can be further treated in bleaching zone 43 and washer 45, and in one or more additional bleaching steps if required, to yield a bright, high-quality pulp product 47. Bleaching agents used in zone 43 and additional bleaching stages are selected from the group consisting of peroxide, ozone, hypochlorite, hydrosulfide, chlorine, and chlorine dioxide.

It has been found in the present invention that the simultaneous contacting of pulp, surfactant, and oxygen in reaction zone 25 yields an unexpectedly brighter and cleaner pulp compared with the separate addition of the same dose of surfactant in washer 38 following oxygen treatment in reaction zone 25. This is described more fully in the Examples which follow. While the reasons for this unexpected result are not fully understood, there is apparently some synergy involved in the combination of oxygen and surfactant during the cleaning and bleaching step in reaction zone 25, so that combined oxygen-surfactant treatment is much more efficient than sequential oxygen-surfactant treatment of the pulp.

In alternate mode of the invention, partially cleaned pulp 15 is contacted with chlorine in a first stage, followed by an oxygen stage in which the pulp is contacted with oxygen and alkali, followed by surfactant addition to the oxygen-treated pulp, water washing, and contacting the washed pulp with alkali and peroxide in a final stage. The chlorine stage is operated at a retention time of between about 10 and 45 minutes and an active chlorine dose of between about 1.0 and 6.0 wt % on pulp; the oxygen alkali stage is operated at a pressure between about 10 and 100 psig and a residence time of about 5 to 60 minutes; a surfactant dose of about 0.1 to 1.0 wt % on pulp is used; and the final peroxide stage is operated at a peroxide dose of about 0.1 to 5.0 wt % on pulp and a residence time of about 15 to 120 minutes. Alternately, other bleaching chemicals may be used instead of chlorine as appropriate. The surfactant is selected as described above. It has been found that the addition of a surfactant directly to the oxygen-treated pulp results unexpectedly in a much higher brightness increase in the peroxide stage compared with operation without surfactant, as illustrated in the Examples which follow.

The preferred operating conditions to be employed in individual cases will depend largely on the particular makeup of the starting recycled fiber, including lignin content, amount and type of ink present, content of coatings and fillers, etc. Treatment at lower than required severity limits on pulp having high amounts of any of the contaminants above mentioned would result in smaller than desired increase in brightness. Operation at conditions much beyond the listed upper limits would result in large losses in strength and viscosity, and would entail large capital constraints on the equipment needed for effective bleaching and cleaning of the pulp.

Among the other benefits obtained by the invention is the decrease or total avoidance in the final bleaching stages of the otherwise needed use of chemicals such as hydrosulfide and/or chlorinated compounds which are harmful to the environment if discharged directly or expensive to remove from effluent streams before discharge. Accordingly, it becomes possible to reduce a typical five stage bleaching sequence to a two or three stage sequence with resulting reduction in capital equipment costs.

Experiments were carried out in the laboratory to determine the effects of treating secondary pulp with a surfactant and oxygen in various combinations, and also to determine the effects of bleaching before and after oxygen treatment. In these experiments, a commercially cleaned and deinked pulp containing 5-10% residual ink and contaminants was used.

EXAMPLE 1

Procedure I.—The $O_SP$ Process (Oxygen-surfactant, Peroxide)

A. Oxygen Bleaching/Surfactant Stage ($O_S$)

The cleaned and washed pulp was placed in a laboratory oxygen reactor system which consists of a pressurized reactor, mixer, flow controls, and condition monitors. An amount of water and sodium hydroxide was added to the pulp at a 10% consistency of pulp to water (sodium hydroxide amounts varied). Then the reactor was sealed and heated with both steam and an electric mantle (to 60°-130° C.). Next, the reactor was pressurized with oxygen to 30-150 psig and the high shear mixer was turned on for one minute. The pulp was retained in the reactor at these conditions anywhere from thirty minutes to two hours with periodic mixing at ten-minute intervals. The pulp was removed from the oxygen reactor and immediately mixed with 0.25-2.0 wt % on pulp of a surfactant mixture containing 45 wt % Igepal CO-630 (nonyl phenoxy poly[ethyleneoxy] ethanol, which has a hydrophilic-lipophilic balance of 13, made by GAF), 5 wt % Igepal CO-210 (similar to Igepal CO-630 but having a hydrophilic-lipophilic balance of 4.6), 25 wt % ethylene glycol, and 25 wt % water.

B. Wash Stage

The mixture was then diluted 3000 ml water, poured into a vacuum filter, and rinsed with approximately 1000 ml of water per 60 grams of air dried pulp.

C. Peroxide Stage (P)

After being washed and filtered the pulp was placed in a polyester bag with 1% sodium hydroxide dosage and 1% hydrogen peroxide dosage. Water was added to make the pulp a 12% consistency. The bag was heat sealed and placed in a constant temperature bath at 150°-180° F., and 60-120 minutes. The pulp was then removed from the bath and bag, put into the vacuum filter, and dried to approximately 25% consistency. Pulp viscosity (T230) was measured, and handsheets were made (T218) and tested for brightness (T217) in accordance with the respective TAPPI Standard Test Procedures. Chemical charges are on a weight percent basis and pulp weight is on an air dried basis. The listed test procedures are described in TAPPI: Standard Test Methods 1989.

Figure 2:
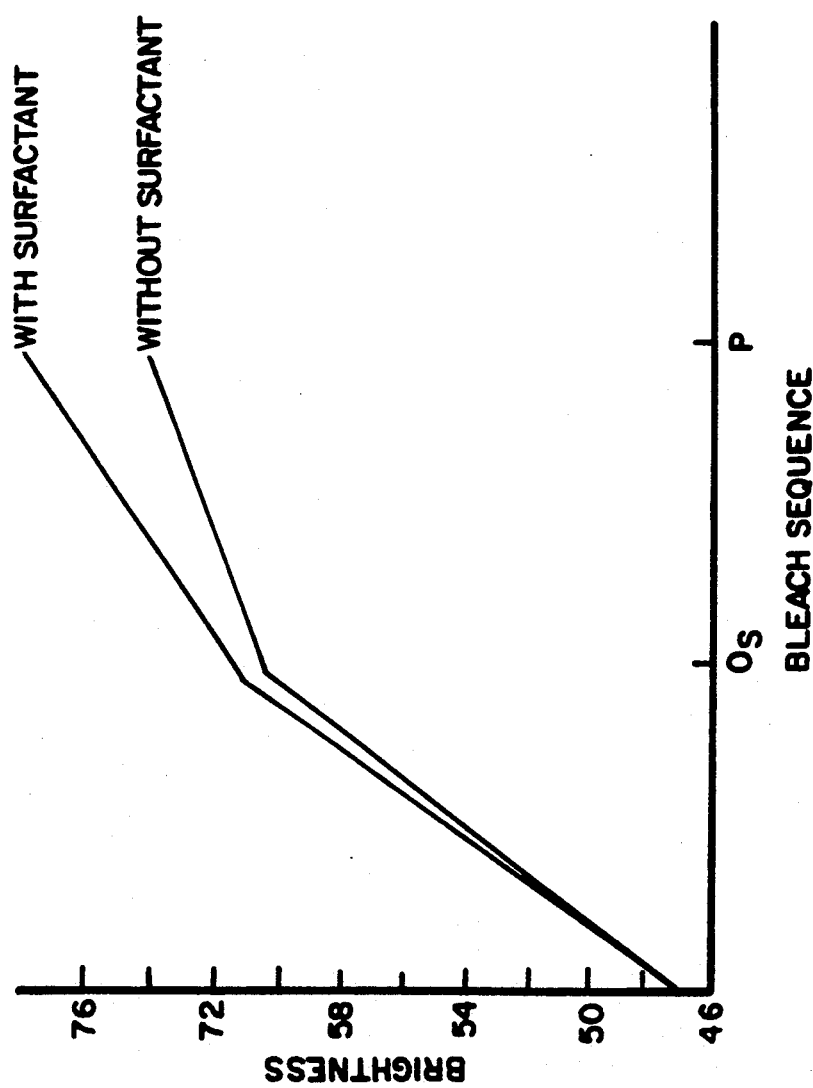
FIG. 2 is a graph showing the effect of surfactant added to oxygenated pulp on attained brightness under conditions corresponding to Example 1 of the description.

The operating conditions employed in the runs using Procedure I are set out in Table 1 below and the measured brightness of the pulp at the several treating stages is reported in Table 2 and FIG. 2.

TABLE 1

|  | Oxygen Treatment | Peroxide Treatment |
|---|---|---|
| Temp., ° C. | 130 | ~65° |
| Alkali dosage (%) | 5 | 1.0 |
| Retention Time (hrs) | 1 | 2 |
| Pressure (psig) | 150 | — |
| Surfactant (%) | 0.5 | — |
| Peroxide (%) | — | 1.0 |

TABLE 2

| | Brightness (GE) | |
|---|---|---|
| Stage | With Surfactant | Without Surfactant |
| Initial | 56.9 | 56.9 |
| Oxygen | 69.0 | 69.0 |
| Wash | 71.4 | 70.3 |
| Peroxide | 78.0 | 74.1 |
| Brightness increase in peroxide stage | 6.6 | 3.8 |

The brightness increase across the peroxide stage of 6.6 points when surfactant was used is significantly and unexpectedly higher than the increase of 3.8 points when no surfactant was used.

EXAMPLE 2

Procedure II—The $CO_SP$ Process

A. Chlorination Stage (C)

Sixty oven-dried grams of pulp at 4% consistency was placed in a polyester bag and an amount of chlorine water added to make a charge of 2.0% active chlorine. The bag was heat sealed and the chlorination proceeded at ambient temperature for one hour. The pulp was filtered and washed with water.

B. Oxygen Bleaching/Surfactant Stage ($O_S$)

Procedure for (IA) was followed with different conditions within the reactor (as reported below) being observed. The pulp was dosed with 1.5 wt % on dry pulp of sodium hydroxide and the temperature was set at 65°-100° C. Pressure was set 30-50 psig for a 10-minute retention time to simulate an upflow tube reactor. Oxygenated pulp was then held at approximately atmospheric pressure for 50 minutes. The surfactant used was a mixture containing 50 wt % Turgitol 24L-50 (a mixture of linear secondary alcohols reacted with ethylene oxide, made by Union Carbide), 32 wt % ethylene glycol, and 18 wt % water) at 1.0 wt % on dry pulp.

C. Wash Stage: Same as Step B, Example 1

D. Peroxide Stage (P): Same as Step C, Example 1

The conditions of Procedure II ($CO_SP$) are summarized in Table 3 below and the attained brightness at the several stages is set out in Table 4.

TABLE 3

| Conditions: | $Cl_2$ | $O_S$ | P |
|---|---|---|---|
| Temperature, ° C. | 45 | 65 | 65 |
| $Cl_2$ Dosage, (%) | 2.0 | * | * |
| Consistency (%) | 4.0 | 10.0 | 12.0 |
| Retention Time (hrs) | 0.5 | 0.83 | 2.0 |
| Pressure (in upflow tower) psig | * | 30 | * |
| Retention Time (in upflow tower) (min) | * | 10 | * |
| Peroxide Dosage (%) | * | * | 1.0 |
| NaOH Dosage (%) | * | 1.5 | 1.0 |
| Surfactant Dosage | * | 1.0 | * |

NOTE:
Oxygen was mixed in the reactor for the first ten minutes of the $O_S$ run, at two one-minute intervals every five minutes.

TABLE 4

| | Brightness (GE) | |
|---|---|---|
| Stage | With Surfactant | Without Surfactant |
| Initial pulp | 56.9 | 56.9 |
| $Cl_2$ | 61.0 | 61.0 |
| $O_S$ | 66.8 | 66.8 |
| Wash | 69.2 | 67.9 |
| Peroxide | 77.6 | 73.4 |
| Brightness increase across peroxide stage | 8.4 | 5.5 |

The brightness increase across the peroxide stage of 8.4 points when surfactant was used is significantly and unexpectedly higher than the increase of 5.5 points when no surfactant was used.

In following the procedure of Example 2 wherein an initial chlorine bleaching step is employed, only comparatively low to moderate concentrations of active chlorine are required, in the preferred range of about 0.5 to 3.0% active chlorine in the aqueous medium, and generally at less than 5%.

EXAMPLE 3

Figure 3:
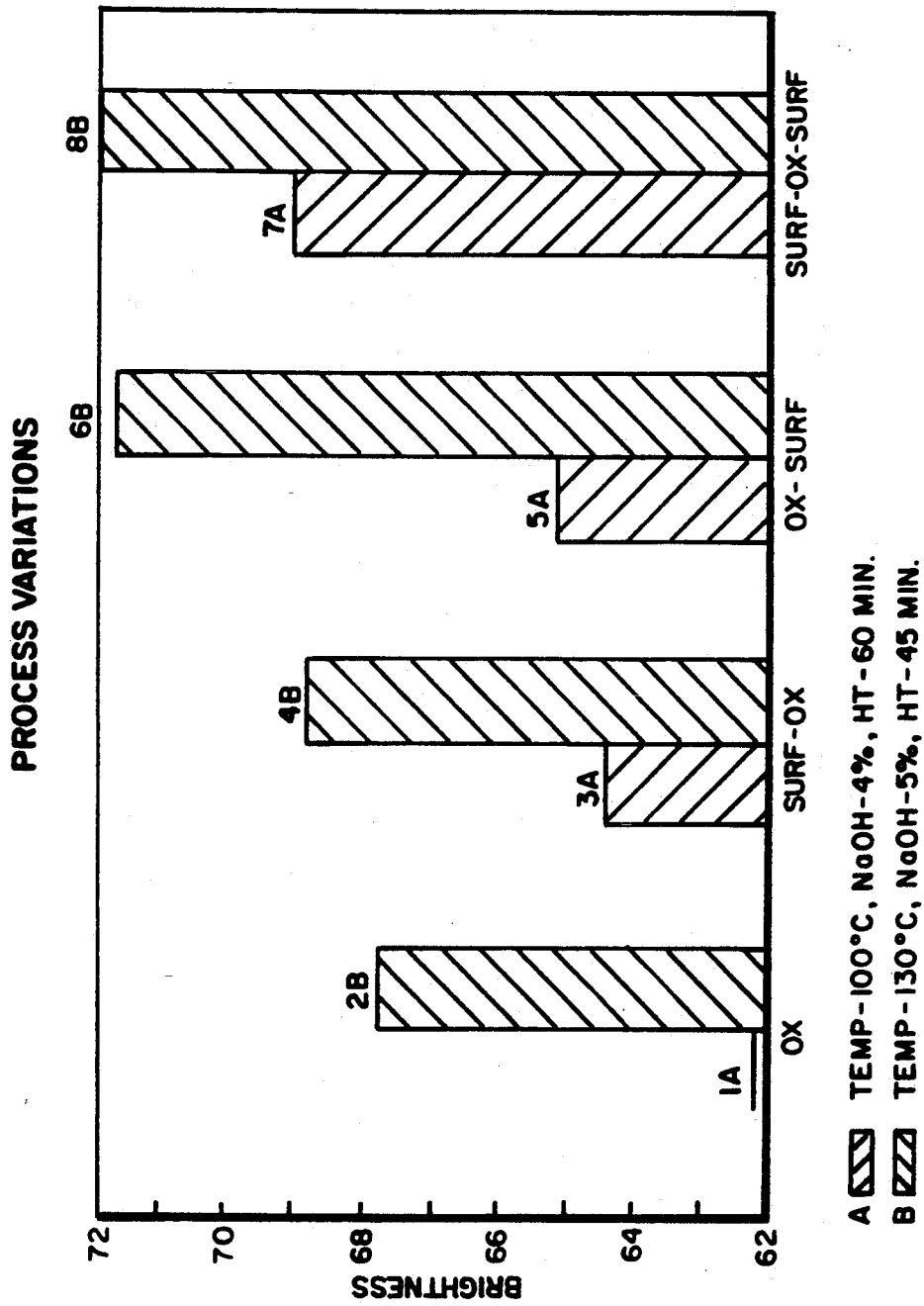
FIG. 3 is a series of bar graphs showing the effect of process variations on attained pulp brightness at various stages of the bleaching sequence.

A series of experiments was conducted with variations in process conditions to determine which order of oxygen and surfactant contacting prior to washing would be most beneficial for increasing brightness. The results are plotted in FIG. 3.

Eight experiments were carried out: four at set of conditions A (100° C., 4% NaOH, 60 min retention time, 130 psig) and four at set of conditions B (130° C., 5% NaOH, 45 min retention time, 130 psig). One experiment from each set was kept as a control, one pair was treated prior to the oxygen run with a surfactant wash, one pair was treated after the oxygen run with surfactant followed by a water wash, and one pair was treated prior and after the oxygen run with surfactant and a water wash. The surfactant used was the same as that of Example 2, and the dose was 0.5 wt % on dry pulp. Handsheets were made and the brightness of each was measured, the results of which are reported in Table 5 and FIG. 3.

TABLE 5

| | (A) Brightness | (B) Brightness |
|---|---|---|
| Oxygen | 62.2 | 67.9 |
| Surfactant-Oxygen | 64.5 | 68.8 |
| Oxygen-Surfactant | 65.1 | 71.8 |
| Surfactant-Oxygen-Surfactant | 69.0 | 72.0 |

From the data shown in Table 5 it appears that surfactant washing followed by an oxygen reaction, at B conditions, in turn followed by a further surfactant treatment and water washing gives the best brightness results. If high brightness is desired at a milder set of conditions (A), the surfactant-oxygen-surfactant sequence is preferred.

As shown in Table 5, treatment with surfactant before oxygen treatment does yield some improvement in brightness but less than that achieved by application of surfactant to the oxygenated pulp followed by water washing step.

EXAMPLE 4

There are basically three different types of surfactants: nonionic, anionic, and cationic. In the experiments reported below, one oxygen reaction was performed and the pulp from that reaction was divided into four samples (a) through (d); the tested brightness of each set of samples is set out in Table 6.

TABLE 6

| | Brightness |
|---|---|
| (a) Washed with DI water (1000 mls/), then bleached with peroxide. | 74.5 |
| (b) Washed with nonionic surfactant in a 1000 mls of DI water, then bleached with peroxide. | 77.3 |
| (c) Washed with anionic surfactant in a 1000 mls of DI water, then bleached with peroxide. | 76.2 |
| (d) Washed with cationic surfactant in a 1000 mls of DI water, then bleached with peroxide. | 72.3 |

The surfactants employed at 0.5% by weight of pulp, were as follows:
(a) none
(b) nonylphenoxy(ethyleneoxy)ethanol in aqueous ethylene glycol
(c) Adogen 464 (Ashland Chem.) Methyltrialkyl $C_8$–$C_{10}$-ammonium chloride
(d) Sodium dioctyl sulfosuccinate (American Cyanamide)

EXAMPLE 5

Numerous experiments were run to determine the ranges of conditions (temperature, pressure, retention time, caustic dosage) most appropriate for the oxygen stage. The effect of changing certain conditions while holding others constant on the final brightness of the pulp was also examined.

Each of the experiments of these examples addresses a particular condition or conditions.

1. The effect of sodium hydroxide dosage on pulp brightness (Temperature—130° C., Pressure—150 psig, Retention Time—45 min.):

TABLE 7

| | Brightness (GE) | |
|---|---|---|
| NaOH % Dosage Stage | After Oxygen Stage | After Oxygen & Peroxide |
| 1.5 | 70.2 | 74.0 |

TABLE 7-continued

| NaOH % Dosage Stage | Brightness (GE) | |
|---|---|---|
| | After Oxygen Stage | After Oxygen & Peroxide |
| 3.0 | 70.1 | 74.6 |
| 4.0 | 70.0 | 75.1 |
| 5.0 | 69.9 | 78.0 |
| 5.5 | 71.8 | 79.1 |
| 6.0 | 72.3 | 80.6 |
| 7.0 | 73.4 | 82.2 |

Figure 4:
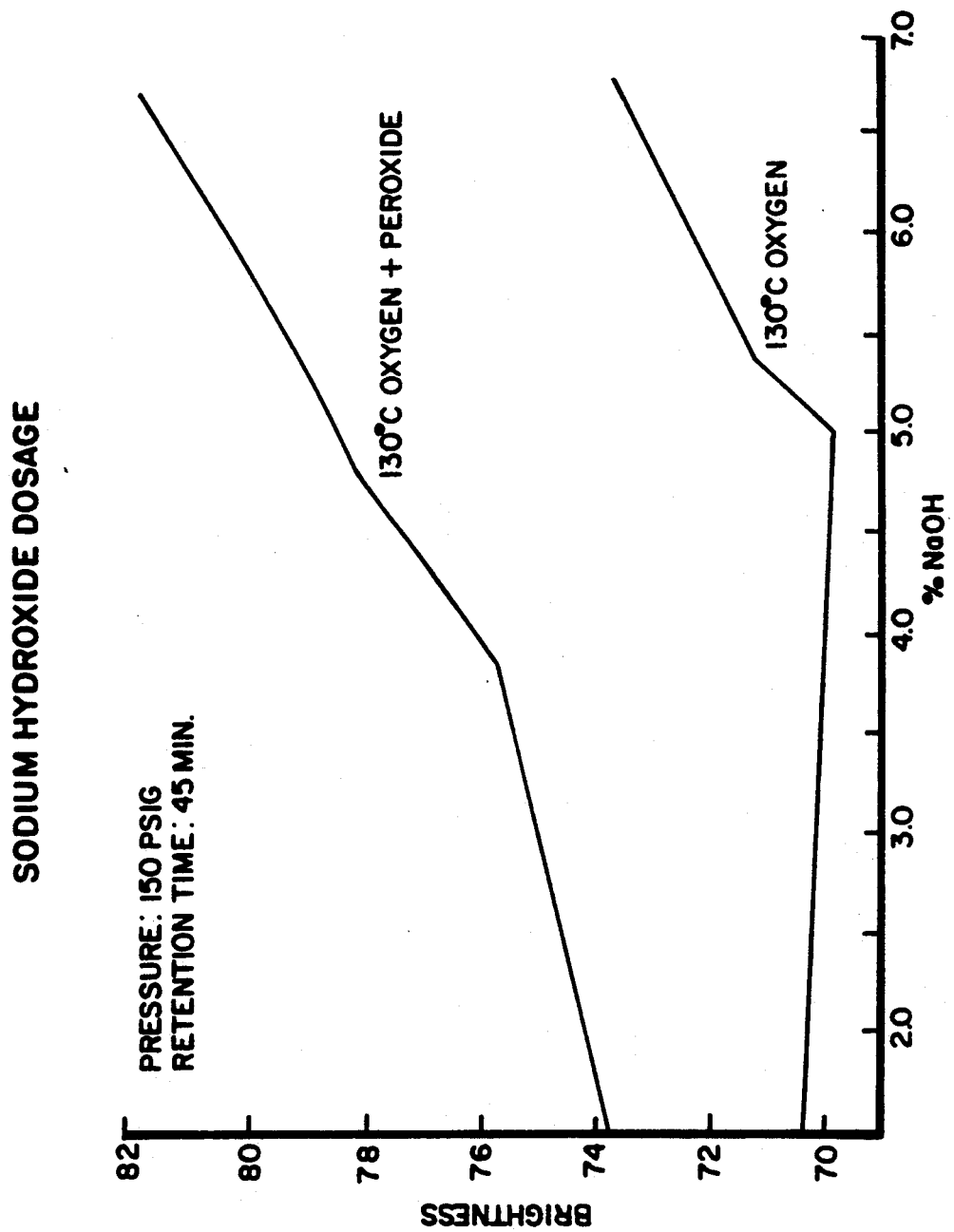
FIG. 4 is a graph showing the effect of sodium hydroxide dosage on attained pulp brightness before and after peroxide bleach.

The results are plotted in FIG. 4.

2. The effect of retention time and temperature (pressure held at 130 psig, NaOH at 4%):

TABLE 8

| Retention Time | Brightness (GE) | |
|---|---|---|
| | 100° C. | 130° C. |
| 45 min | 65.5 | 70.0 |
| 90 min | 67.6 | 70.1 |
| 135 min | 69.7 | 70.8 |

The results are plotted in FIG. 5.

3. The effect of pressure on brightness results (Temperature held constant at 100° C., NaOH at 4%, and retention time at 1 hour):

TABLE 9

| Pressure PSIG | Brightness (GE) |
|---|---|
| 30 | 63.4 |
| 60 | 65.2 |
| 90 | 67.1 |
| 120 | 68.3 |
| 150 | 69.6 |

EXAMPLE 6

A series of experiments summarized below was carried out to illustrate the effects of surfactant addition location on pulp brightness and cleanliness.

| Run 1: | 70 grams (oven-dried) of commercially deinked pulp containing about 5% of the original ink present in the waste paper furnish was prepared at 30% consistency. The pulp was dosed with sodium hydroxide at 3 wt % based on dry pulp and was contacted with oxygen in a mixed laboratory reactor at 20 psig total pressure, 95° C., and 60 minutes retention time. The pulp was removed from the reactor, diluted to 2% consistency, stirred, and drained on a vacuum screen. During draining, the pulp was showered with 1000 ml of tap water at 150° F. The pulp was suction dried to a 20% consistency. |
|---|---|
| Run 2: | Same as Run 1 but with 0.25 wt % of nonyl ethoxylate, a nonionic surfactant, added to the shower water used for pulp washing. |
| Run 3: | Same as Run 1 but with 0.25 wt % of nonyl ethoxylate, a nonionic surfactant, added to the pulp directly before the addition of oxygen to the pulp in the reactor. |
| Run 4: | Same as Run 2 but at oxygen reactor conditions of 90 psig and 10% consistency. |
| Run 5: | Same as Run 1 but at oxygen reactor conditions of 90 psig and 10% consistency, and mixing 0.25 wt % of the surfactant with the pulp immediately after removal from the reactor. |
| Run 6: | Same as Run 5 except that 0.25 wt % of the surfactant was added to the pulp directly before the addition of oxygen to the pulp in the reactor instead of after removal of pulp from the reactor. |

Handsheets were made from the treated pulp from each run, as well as from untreated pulp, and tested for GE brightness. The cleanliness of each handsheet was determined by counting under magnification the number of visible specks per square centimeter, defined as speck count/sq cm. The results are summarized in Table 10.

TABLE 10

| Run No. | Brightness (GE) | Speck count/sq cm |
|---|---|---|
| Untreated | 68.4 | 151 |
| 1 | 72.6 | 162 |
| 2 | 73.3 | 147 |
| 3 | 75.3 | 98 |
| 4 | 74.6 | 139 |
| 5 | 76.8 | 89 |
| 6 | 77.3 | 71 |

A comparison of Runs 2 and 3, as well as a comparison of Runs 4 and 6, shows clearly and unexpectedly that the simultaneous contacting of pulp, surfactant, and oxygen yields a brighter and cleaner pulp compared with the addition of the same dose of surfactant in the wash step following oxygen treatment. The use of oxygen and surfactant simultaneously thus is preferred in the practice of the present invention. A comparison of Runs 5 and 6 indicates that addition of the surfactant at the end of the oxygen contacting step gives results which are only slightly below the results when the surfactant is added before the oxygen contacting step. Since there is typically residual oxygen present in the pulp when removed from the reactor, it appears that simultaneous contacting of pulp with surfactant and oxygen also occurred in Run 5, which supports the conclusion that this simultaneous contacting yields unexpectedly better results than separate contacting as in Run 4.

In the practice of the present invention, desired brightness of the treated pulp often may be obtained without a final chemical bleaching step after the oxygen/surfactant treatment and water washing. If such chemical bleaching is used, it is preferred to employ peroxide. The use of controlled small amounts of hypochlorite in a final bleach sequence is not ruled out, however, particularly when chlorine or chlorine compounds have not been earlier employed in the pulp treating sequence.

As indicated in FIG. 1, a surfactant may be introduced at any one or more points in the pulp treating sequence, as indicated at 21, 27, 37, and 39. Preferably, a surfactant is introduced into pulp stream 15 at 21 prior to the oxygen reactor. The pulp, after washing in washer 38, will be substantially free of applied surfactant.

In accordance with an embodiment of the invention, at least part of the alkaline filtrate 45 from the oxygen stage washer 38 is recycled to a selected stage of the cleaning sequence, whereby costs of energy supplied and chemical consumption costs are greatly reduced. As shown in FIG. 1, the wash liquor filtrate 45 is discharged from washer 38 and a controlled portion 43 is recycled to a selected stage of the cleaning sequence. Thus, as shown in the illustrated embodiment in FIG. 1, the withdrawn portion 43 may be returned to the hydropulping step 3 or to the cleaning flotation stage 11. Optionally a part of the liquor may be returned and included as part of the wash water employed in the oxygen stage washer 38, thus providing useful surfactant at this stage.

The oxygen stage filtrate 45, it should be noted, contains heat, water, caustic, and surfactant from the pulp). These resources would probably be sent to the sewer (as waste) in normal operation of a secondary fiber bleach plant. By the proposed recycling step important savings in mill operation are attained without sacrifice in product quality.

Thus the present invention teaches specific and unexpected benefits from the addition of a surfactant at selected locations in oxygen-based treatment sequences for the bleaching and cleaning of secondary pulp. When an oxygen bleaching step is followed by a washing step, surfactant is preferably added before or during pulp contacting with oxygen. When a chlorination/oxygen alkali bleaching/peroxide sequence is used, the addition of a surfactant to the oxygen-treated pulp significantly improves the brightness increase in the peroxide step.

The essential characteristics of the present invention are described completely in the foregoing disclosure. One skilled in the art can understand the invention and make various modifications thereto without departing from the basic spirit thereof, and without departing from the scope and range of the claims which follow.

I claim:

1. A method for the cleaning and bleaching of secondary pulp prepared from waste paper material which comprises:
   (a) contacting said pulp with alkali, oxygen, and a surfactant in a pressurized reaction zone, wherein said oxygen and surfactant simultaneously contact said pulp for at least a portion of the residence time of said pulp in said reaction zone;
   (b) withdrawing from said reaction zone an intermediate pulp comprising cleaned and bleached fiber suspended in a liquor which contains dissolved and suspended reaction products from cleaning and bleaching reactions occurring in step (a); and
   washing said intermediate pulp to separate said liquor from said fiber to yield a cleaned and bleached secondary fiber product;
   wherein said surfactant is selected from the group consisting of anionic, cationic, nonionic, and polymeric surfactants and mixtures thereof, and is added to said pulp at a dose between about 0.1 to 2.0 wt % on dry pulp.

2. The method of claim 1 wherein said surfactant is added to said pulp before the addition of oxygen to said pulp in said reaction zone.

3. The method of claim 1 wherein said surfactant is added to said pulp following the addition of oxygen to said pulp and prior to the complete consumption of said oxygen during said cleaning and bleaching reactions in said reaction zone.

4. The method of claim 1 wherein said reaction zone is operated at a pressure between about 10 and 120 psig.

5. The method of claim 1 wherein said reaction zone is operated at a temperature between about 120 and 300 degrees F.

6. The method of claim 1 wherein said reaction zone is operated at a consistency between about 4 and 40%.

7. The method of claim 1 wherein said reaction zone is operated at a residence time between about 1 and 120 minutes.

8. The method of claim 1 wherein said surfactant is selected from the group consisting of nonyl ethoxylated linear alcohols, dodecyl ethoxylated linear alcohols, and alkyl phenyl ethoxylated linear alcohols, and mixtures thereof.

9. The method of claim 1 wherein an additional surfactant is added to wash water used in said washing step (c).

10. The method of claim 9 wherein said additional surfactant is selected from the group consisting of anionic, cationic, nonionic, and polymeric surfactants and mixtures thereof.

11. The method of claim 10 wherein said additional surfactant is selected from the group consisting of nonyl ethoxylated linear alcohols, dodecyl ethoxylated linear alcohols, and alkyl phenyl ethoxylated linear alcohols, and mixtures thereof.

12. The method of claim 1 which further comprises additional bleaching of said secondary fiber product in one or more bleaching stages following washing step (c) to yield a higher brightness secondary fiber product.

13. The method of claim 12 wherein said additional bleaching utilizes one or more bleaching agents selected from the group consisting of ozone, hypochlorite, hydrosulfide, chlorine, and chlorine dioxide.

14. The method of claim 1 which further comprises treating said secondary pulp prior to step (a) in one or more steps selected from the group consisting of cleaning, flotation, washing, dispersion, and bleaching.

* * * * *

UNITED STATES PATENT AND TRADEMARK OFFICE
CERTIFICATE OF CORRECTION

PATENT NO. : 5,234,544

DATED : August 10, 1993

INVENTOR(S) : Ronald C. Naddeo

It is certified that error appears in the above-identified patent and that said Letters Patent is hereby corrected as shown below:

Column 11, Claim 1, Line 35
    Before "washing", insert --(c)--

Signed and Sealed this

Twenty-ninth Day of March, 1994

*Attest:*

BRUCE LEHMAN

*Attesting Officer*     *Commissioner of Patents and Trademarks*